United States Patent [19]

Hadden, Sr.

[11] Patent Number: 4,934,204
[45] Date of Patent: Jun. 19, 1990

[54] FORCE TRANSLATING AND AMPLIFYING LINKAGE

[76] Inventor: Edward L. Hadden, Sr., 110 E. Maplewood Ave., Mechanicsburg, Pa. 17055

[21] Appl. No.: 362,799

[22] Filed: Jun. 7, 1989

[51] Int. Cl.$^5$ .................. F16H 25/18; B21D 9/08; B26F 1/36
[52] U.S. Cl. .................. 74/107; 72/402; 72/410; 74/105; 74/567; 74/569; 269/196; 269/229
[58] Field of Search ............... 74/107, 106, 567, 569; 72/402, 410; 269/196, 197, 198, 201, 228, 229; 188/329, 330, 332, 338, 339

[56] References Cited

U.S. PATENT DOCUMENTS

| | | | |
|---|---|---|---|
| 1,514,054 | 11/1924 | Lancia | 188/330 |
| 1,875,736 | 9/1932 | Johnson | 269/229 X |
| 2,985,047 | 5/1961 | Van Oort | 72/402 |
| 3,469,660 | 9/1969 | Mathers | 74/107 X |
| 4,561,282 | 12/1985 | Hadden, Sr. | 74/105 X |

FOREIGN PATENT DOCUMENTS 683753 6/1930 France ................ 188/330

Primary Examiner—Allan D. Herrmann
Attorney, Agent, or Firm—Charles J. Long

[57] ABSTRACT

A new compact linkage for translating rotary input force to amplified linear output force includes two force applying members which move apart relatively during operation of the linkage. A strut is pivotally attached at one end to each of the force applying members; the struts extend towards each other with a space between their free ends. Each strut has a bearing surface at its free end. A cam-roll member is interposed between the bearing surfaces of the struts and includes cam surfaces in contact with the bearing surfaces. When the cam-roll member is rotated by a lever attached thereto, it translates the rotary input force from the lever into linear output force by a rolling action of the cam-roll member against the bearing surfaces of the pivoted struts. The linkage is markedly more efficient in force translation and transmission than pivoting toggle linkages typical of the prior art.

14 Claims, 4 Drawing Sheets

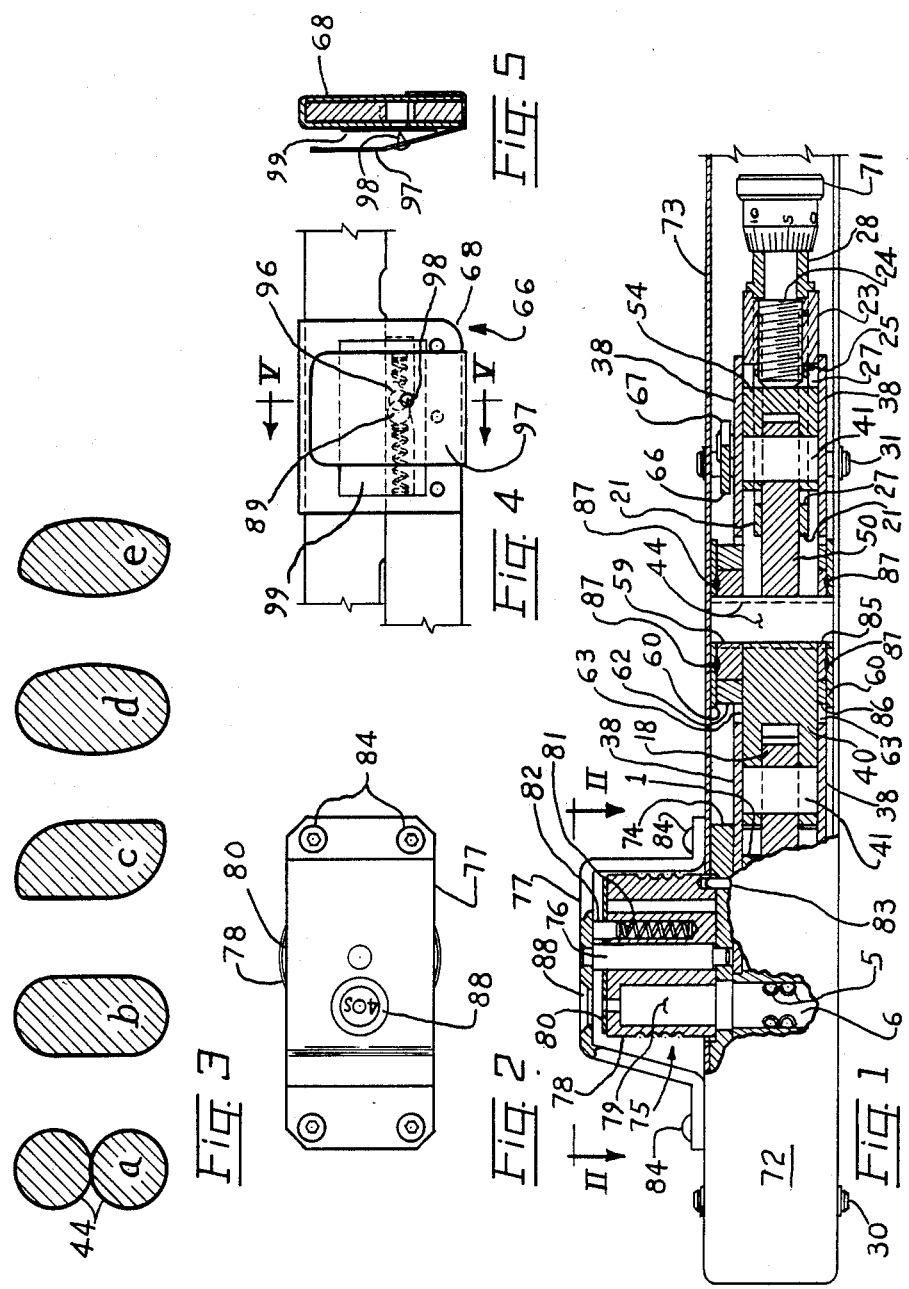

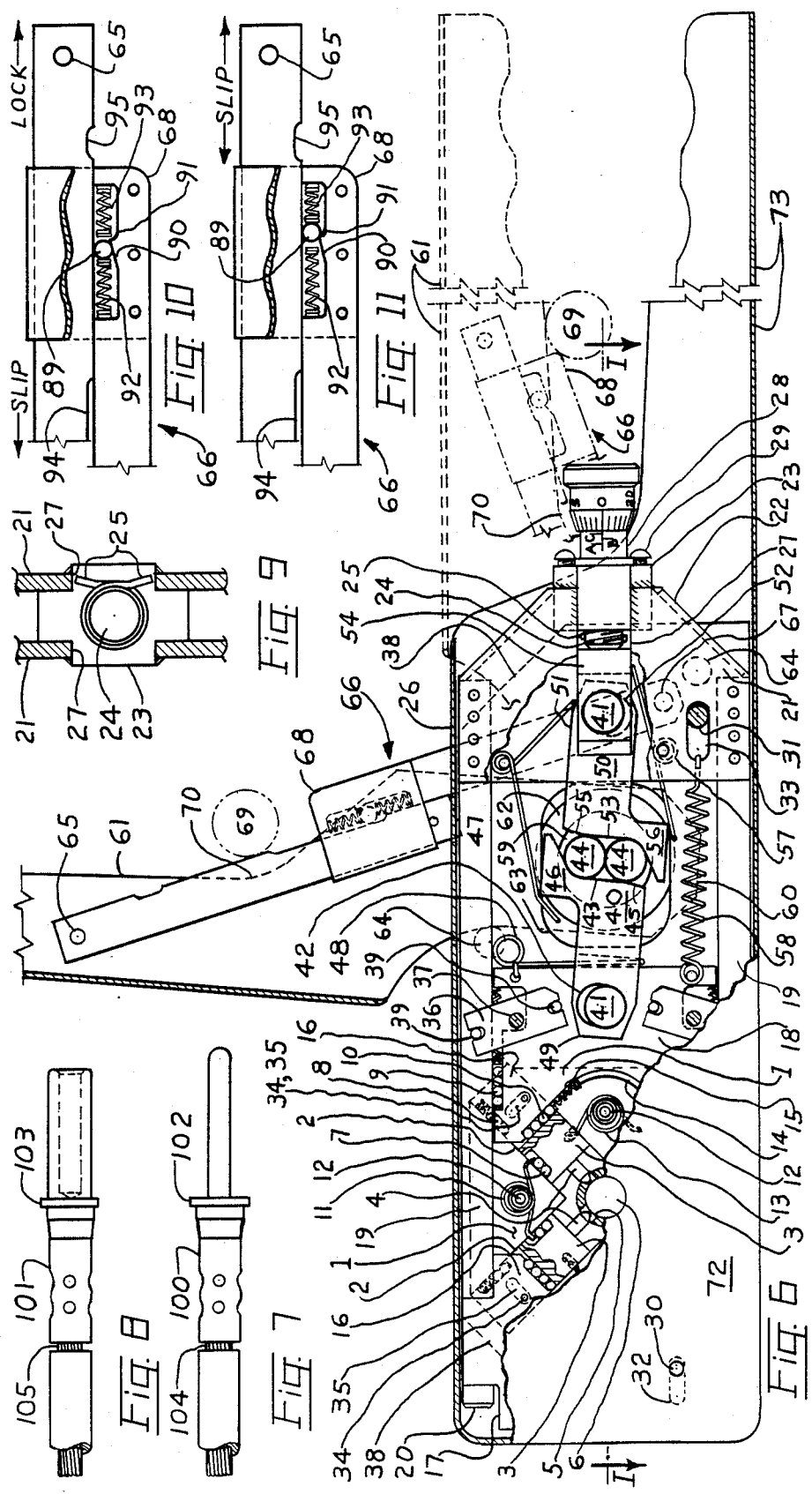

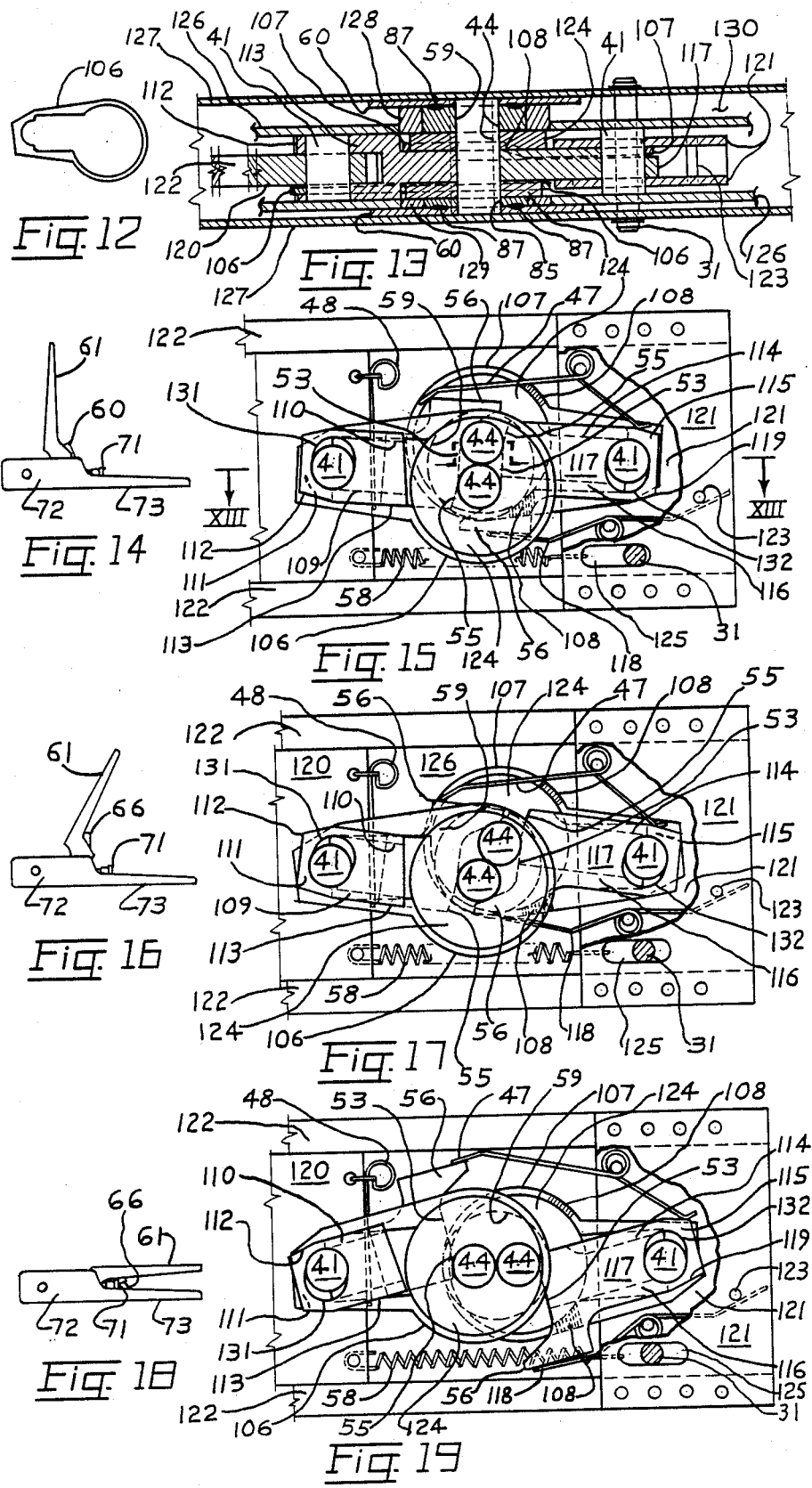

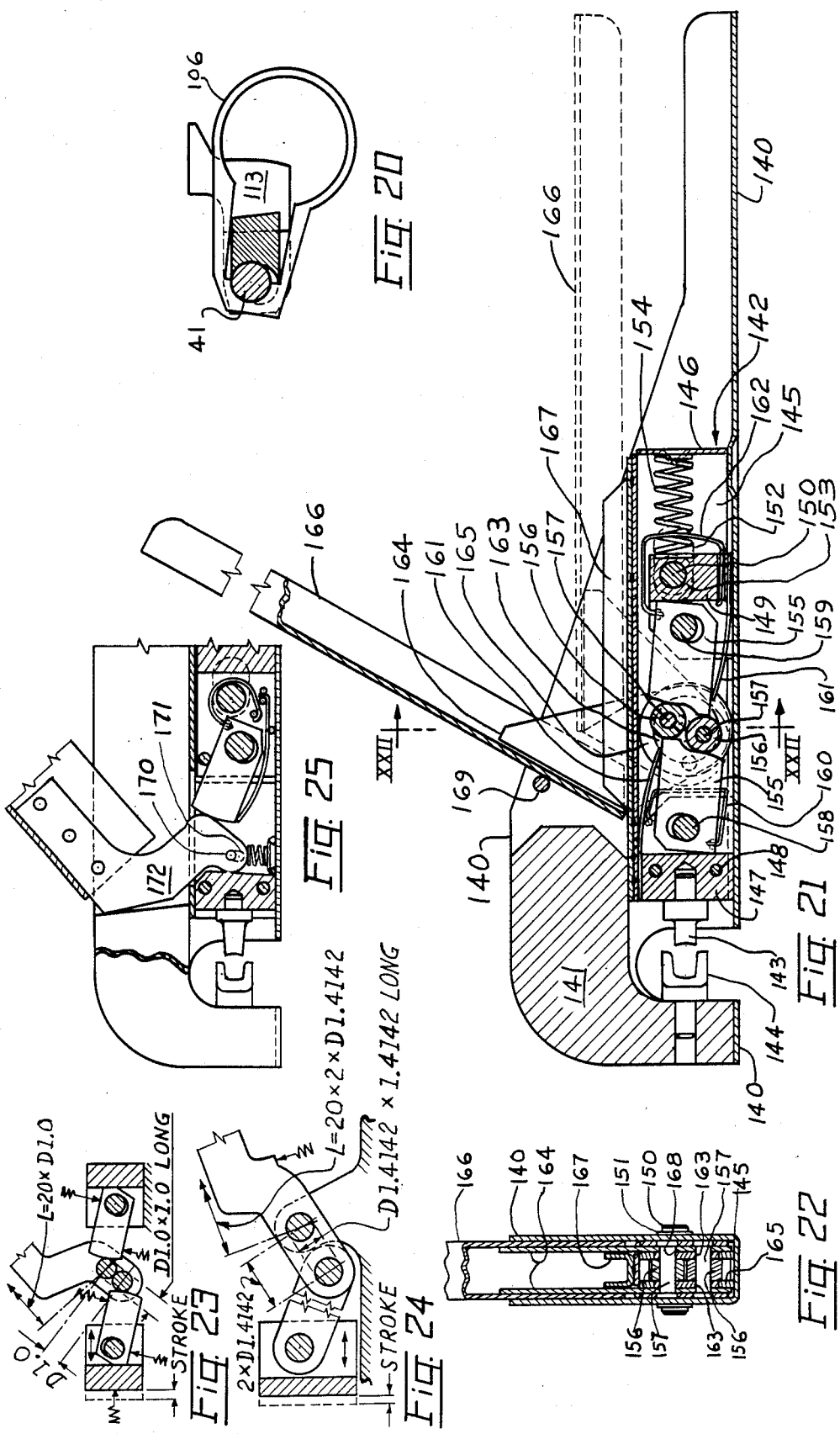

FORCE TRANSLATING AND AMPLIFYING LINKAGE

BRIEF SUMMARY OF THE INVENTION

This invention relates to linkages for use in force applying devices such as power or hand-operated crimping tools. More particularly, the invention relates to a compact linkage for translating rotary input force to amplified linear output force. Such a linkage is especially useful in devices such as hand-operated tools for crimping, riveting or staking operations and the like, although its use is not limited to such tools.

In the field of tools for crimping, staking and the like, the prior art includes numerous pliers, levers and toggle-actuated tools. See, for example, my prior U.S. Pat. No. 4,561,282 and the references cited therein. With particular reference to four-indent type crimping tools, in which a wire is secured in the bore of a contact member by force of circumferentially evenly spaced indents formed by suitable indenters, the prior art of which I am aware, includes four basic types of tools, as follows:

a. Tools wherein four internal cams in a circular array are rotated by a hand lever to cam four indenters inwardly against their return springs (e.g., U.S. Pat. No. 3,459,029);

b. Tools wherein coaxial oppositely rotating sets of four internal cams in circular array are rotated by opposite hand levers to cam a common set of four indenters inwardly against their return springs (e.g., U.S. Pat. No. 3,177,695);

c. Tools wherein a system of mutually camming levers having indenter points are closed by means of a plier-type tool system to allow the crimp workpiece to enter and leave the tool sideways from the open end of the tool, rather than being axially inserted and withdrawn (e.g., U.S. Pat. No. 3,375,697); and d. Tools having two opposed cam blocks, one moveable by a toggle linkage, each block having two 45 degree cams to cam adjacent pair of indenters in a crimp module inwardly against their return springs, while continuously centering the crimp module between the cam blocks by means of synchronizing levers (e.g. U.S. Pat. No. 3,080,779).

Although most of the prior art hand tools can be used satisfactorily for some small diameter crimps, attempts to apply prior art designs to large crimps involving e.g., No. 8 to No. 4 wire gauges, have shown that either the required force cannot be reached or the tools must be made unacceptably large and heavy. This is principally because historical practice in lever and/or toggle linkage applications typical of prior art crimping tools establishes the input/output ratio of the linkage and then establishes the appropriate pivot component sizes to withstand the application loads. This may result in a power ratio and load bearing relationship that is ergonomically not feasible with respect to practical manual use by an average human being—i.e., the tool becomes too large and cumbersome for the intended application.

I have invented a compact linkage for translating rotary input force, such as that generated when the handles of a manual crimping tool are squeezed together, to linear output force which is amplified to hitherto unavailable levels. When embodied in a manual crimping tool, my invention results in a tool which crimps a range of products from a No. 4 contact with a No. 4 wire down to a No. 10 contact with a No. 12 wire, with input force requirements well within the normal operator's capability.

In accordance with the invention, I provide a compact linkage for translating rotary input force into amplified linear output force, the linkage residing between two spaced apart parallel planes and comprising first and second force output members adapted for relative movement toward and away from each other along an output axis parallel to the planes, between an initial proximal spacing and a final more distant spacing; first and second struts pivotally engaging the first and second force output members respectively, each strut being adapted for oscillatory movement about a pivot axis which is normal to the planes and having a bearing surface spaced from its pivot axis and also normal to the planes, the bearing surfaces of the struts facing each other and being separated by a predetermined minimum distance when the force output members are at their initial spacing and a predetermined maximum distance when the force output members are at their final spacing; a cam-roll member positioned between the strut bearing surfaces, the cam-roll member being rotatable about a central axis which is normal to the planes and having cam surfaces in contact with both strut bearing surfaces, the shape of the cam-roll member being such that rotation thereof from a first position to a second position increases the distance between the strut bearing surfaces from the predetermined minimum distance to the predetermined maximum distance; and means for applying input force to rotate the cam-roll member from the first position to the second position.

In a preferred embodiment, I provide such a linkage in which the strut bearing surfaces and the cam surfaces are so shaped that rotation of the cam-roll member from the first to the second positions when the struts are unrestrained against pivoting results in rolling contact between the cam surfaces and the strut bearing surfaces and also concomitant pivoting of the struts in opposite rotational directions.

In a useful embodiment, each strut bearing surface is a flat plane normal to the parallel planes and substantially normal to an axis joining the pivot axis of the strut with the center of the bearing surface. However, I prefer that at least a portion of each strut bearing surface be convexly curved in the direction of the cam-roll member, and optimally that the bearing surface of each strut define a sector of a cylinder having its center at the strut's pivot axis.

In a further preferred embodiment, the cam surfaces of the cam-roll member are convexly curved in the direction of the strut bearing surface contacted by each cam surface, and desirably, the cam surfaces are sectors of cylinders.

In one especially useful embodiment of my invention, the cam-roll member comprises two cylindrical pins having axes normal to the parallel planes and being tangent to each other at the central axis. However, in some circumstances, I may provide that the cylindrical pins are spaced from each other along the line passing through their axes and the central axis.

For best results, the linkage according to my invention also includes biasing means restraining the struts against pivoting out of the position they assume when the cam-roll member is at the first position, whereby when the force output members are under zero or low loads, rotation of the cam-roll member from the first position causes the struts to be slip-cammed apart without pivoting, but when the force output members are under loads sufficient to overcome the effect of the biasing means, further rotation of the cam-roll member causes rolling contact between the cam surfaces and the strut bearing surfaces and also concomitant pivoting of the struts from that point until the second position of the cam-roll member is reached.

When a linkage according to the invention is incorporated in a manual crimping tool, the means for applying input force may comprise a shell frame member sized and shaped to closely accommodate the force output members for movement along the output axis, the shell frame member enclosing the linkage, an extension of the shell frame member forming a first lever arm; and a second lever arm attached to the cam-roll member for rotation thereof, the second lever arm being so sized and positioned with respect to the cam-roll member that when the cam-roll member is in the first position, the second lever arm forms an angle with the first lever arm and when the cam-roll member is in the second position the second lever arm is substantially parallel to and coextensive in length with the first lever arm.

In another embodiment incorporated in a manual crimping tool, the means for applying input force may comprise a shell frame member sized and shaped to closely accommodate the force output members for movement along the output axis, the frame member enclosing the linkage and attached to one of the force output members, an extension of the shell frame member forming a first lever arm; and a second lever arm pivotally attached at one end to the shell frame member at a point near the end of the shell frame member which is opposite the end of the first lever, for pivotal movement between an open position in which the second lever arm forms an angle with the first lever arm and a closed position in which the second lever arm is substantially parallel to and coextensive in length with the first lever arm; a third lever arm attached at one end to the cam-roll member for rotation thereof; and means for engaging the other end of the third lever arm with the second lever arm, the last mentioned means being so constructed and arranged that when the second lever arm is pivoted from the open position to the closed position, the third lever arm is pivoted to rotate the cam-roll member from the first to the second positions.

For safety, and to insure completion of the force-applying stroke in a manual crimping tool incorporating a linkage according to the invention, I may include a ratchet mechanism which prevents reversal of motion of the lever arms during rotation of the cam-roll member from the first position to the second position but allows random reversal of motion of the lever arms between the time the cam-roll member has reached the second position and is being rotated toward the first position and the time the cam-roll member reaches the first position, the ratchet mechanism comprising a first elongated bar having a longitudinal axis parallel to the spaced apart planes and one end pivotally attached to the shell frame member at a point between the cam-roll member and the end of the first lever arm; a second elongated bar having a longitudinal axis parallel to the longitudinal axis of the first bar and having one end pivotally attached to the second lever arm; the first and second bars each having a longitudinal surface, at least a portion of the longitudinal surface of the first bar being maintained in contact with at least a portion of the longitudinal surface of the second bar for sliding movement of the bars relative to each other in the direction of their longitudinal axes, one of the longitudinal surfaces including an elongated recess in the longitudinal direction, the recess being of uniform depth except for a central transverse wedge protruding toward the other longitudinal surface, the side of the wedge closest to the first lever arm forming a straight sloping ramp, the other side of the wedge shaped to form a 90 degree fillet having a radius no larger than a maximum radius R, the other longitudinal surface including two transverse spaced apart depressions, one close to the pivot point of the other bar and the other near the end of the other bar, the first depression being shorter than the second; a rolling member having circular transverse cross-section of predetermined diameter D and radius R positioned within the elongated recess in the one longitudinal surface and in contact with a point on the other longitudinal surface; spring biasing means within the elongated recess tending to maintain the rolling member in contact with a surface of the wedge; and means located on the second bar for maintaining the portions of the longitudinal surfaces in sliding contact and retaining the rolling member and spring biasing means within the elongated recess, wherein the distance between the other longitudinal surface and the tip of the wedge is less than D, the distance between the other surface and the deepest surface of the recess is greater than D, and the distance from the deepest surface of each of the spaced apart depressions to the tip of the wedge is greater than D when the V-shaped wedge is opposite the depression.

In another embodiment of the invention, I provide a compact linkage for translating rotary input force to amplified linear output force, the linkage residing between two spaced apart parallel planes and comprising first and second force output members adapted for relative movement toward and away from each other along an output axis parallel to the planes, between an initial proximal spacing and a final more distant spacing, the first force output member having a bearing surface normal to the parallel planes and facing the second force output member; a strut pivotally engaging the second force output member, the strut being adapted for oscillatory movement about a pivot axis which is normal to the planes and having a bearing surface spaced from its pivot axis and also normal to the planes, the bearing surface of the strut facing the bearing surface of the first force output member and separated therefrom by a predetermined minimum distance when the force output members are at their initial spacing and a predetermined maximum distance when the force output members are at their final spacing; a cam-roll member positioned between the bearing surface on the first force output member and the bearing surface on the strut, the cam-roll member being rotatable about an axis which is normal to the planes and having cam surfaces in contact with both bearing surfaces, the shape of the cam-roll member being such that rotation thereof from a first position to a second position increases the distance between the bearing surfaces from the predetermined minimum distance to the predetermined maximum distance; and means for applying input force to rotate the cam-roll member from the first to the second positions.

As above stated, the linkage of my invention is especially useful in manual four-indent crimping tools, and can best be shown and described as so used; accordingly, the following disclosure and the drawings which are a part hereof show principally manual crimping tools embodying the linkage of the invention.

BRIEF DESCRIPTION OF THE DRAWINGS

In the accompanying drawing figures:

FIG. 1 is a partially sectioned top view of a manual adjustable four indent crimping tool incorporating a linkage according to the invention, illustrating the nesting relationship of various internal tool components and the external relationship of a contact locating turret;

FIG. 2 is a partial rear view of the tool of FIG. 1 taken along the line II—II of FIG. 1 and illustrating a sight hole for viewing the indexing indicia of the contact locating turret of the tool;

FIG. 3 shows five possible cross-sections of cam-roll members according to the invention;

FIG. 4 is a partial side view of a ratchet mechanism used in the tools of FIG. 1 and 6, showing an optional emergency ratchet release method;

FIG. 5 is a sectional view taken along the line V—V of FIG. 4 to illustrate the relationship of a spring-mounted pierce point, a foil tell-tale membrane seal and an access hole in the ratchet cage;

FIG. 6 is a side view of the tool of FIG. 1, partially exposed to illustrate the interior and the function of the linkage of the invention;

FIG. 7 shows a typical pin contact crimped on a wire;

FIG. 8 shows a typical socket contact crimped on a wire;

FIG. 9 is a partial section looking at the inner end of a micrometer adjusting screw used in the tool of FIG. 6, illustrating the loose engagement of the tips of a friction coil spring with a window in the cross head plate;

FIG. 10 is a partially sectioned side view of the ratchet cage of FIG. 4, showing a spring loaded roller sprag in the unidirection locking mode;

FIG. 11 is similar to FIG. 10, but shows the spring loaded roller sprag in the bi-directional slip mode;

FIG. 12 is a front view of an optional tensile link used with the linkage of the invention;

FIG. 13 is a partial top sectional view of a tool similar to the tool of FIG. 6 and incorporating the link of FIG. 12, showing the nesting relationship of the various internal tool components;

FIG. 14 is a reduced side elevation of the tool of FIG. 13 with the hand lever in the fully opened position;

FIG. 15 is an internal elevation showing the linkage position corresponding to FIG. 14;

FIG. 16 is a reduced side elevation as in FIG. 14, but showing the hand lever in the intermediate position as the crimp indenters just impinge upon the wire barrel to be crimped;

FIG. 17 shows the linkage position corresponding to FIG. 16;

FIG. 18 is a reduced side elevation as in FIG. 14, but showing the hand lever in the fully closed position;

FIG. 19 shows the linkage position corresponding to FIG. 18;

FIG. 20 shows how the milled out strut cooperates with the tensile link of FIG. 12 to permit relative swing motion;

FIG. 21 shows a straight action, open frame crimping tool incorporating the linkage of the invention;

FIG. 22 is a sectional elevation taken substantially along the line XXII—XXII of FIG. 21, but with the cam-roll member angularly displaced onto a vertical centerline and the operating lever and extensions shifted to the section plane, for clearer depiction in sectioning;

FIG. 23 shows the basic mechanism of the invention for comparison with a conventional mechanism of the prior art;

FIG. 24 shows, to the same scale as FIG. 23, a conventional toggle linkage of the prior art used to perform the same input/output as the mechanism of FIG. 23; and FIG. 25 shows an embodiment of the invention comprising a single strut and a cam-roll member integral with an operating lever extension.

DETAILED DESCRIPTION OF THE PREFERRED EMBODIMENTS

In the accompanying drawings, in which like numbers refer to like parts, FIG. 6 best illustrates the overall functions of the linkage of the invention as incorporated in a manual adjustable four-indent crimping tool. For convenience, only the upper portion of the left side of FIG. 6 has been cut away; however, it should be understood that the crimping mechanism shown is symmetrical about the crimp bore 6 so that reference numerals identifying one member of the crimping mechanism should, depending on the context, be deemed to apply to one or three other equivalent members in the mechanism, as will be understood by those skilled in the art. Having the foregoing explanation in mind, and referring to the left end of FIG. 6, it will be seen that each of an opposed pair of chassis blocks 1 having cruciform channels 2 slidably accommodates two of four indenter blocks 3 in which are fixed pairs of indenter tips 4 which enter but do not protrude through corresponding radial holes 5 in the barrel of crimp bore 6. Needle bearings 7, 8, 9 and 10 with bias springs are used to bear the heavy output forces. Needle bias springs 11 mounted upon threaded spacers 12 oppose but are easily overcome by the much stronger indenter block return torsion springs 13 mounted upon other threaded spacers 12. Curved double-ended loose piece spring seats 14 mount bias coil springs 15 that control the needles 10. A clevis 16 in each block 3 straddles the 45 degree cam of blocks 17 or 18, as applicable. Cam block 17 is fixed to one end of each of tie bars 19 by cap screws 20. The other ends of tie bars 19 are pinned to cheek plates 21 of a cross head 22.

A tapped cruciform block 23 accommodates a micrometer screw 24; a single coil friction spring 25 engages the exposed micrometer screw threads between windows 27 and cheek plates 21. As shown in FIG. 9, the ends of coil spring 25 loosely engage the window 27 in one cheek plate 21 to maintain the selected micrometer setting.

The micrometer indicia are alpha-numeric since they designate reference positions rather than measurements. The lettered micrometer barrel 28 is adjustably fixed to block 23 by means of clamp screws 29.

From the foregoing, it can be seen that the outer cam block 17, tie bars 19 and cross head 22 are a unitary sub-assembly that can move horizontally along an output axis upon fixed guide pins 30 and 31 engaging a slot 32 in cam block 17 and slots 33 in cheek plates 21 of cross head 22.

Cam block 18, a first force output member, is slidably mounted between tie bars 19 for movement along the output axis, and engages clevises 16 of two of the indenter blocks 3 to enclose space for bearing needles 10 (cam block 17 similarly engages clevises 16 in the other two indenter blocks 3). Spring pins 34 in blocks 17 and 18 are within and loosely associated with slots 35 through the clevises 16 and blocks 3. The pins 34 serve to engage slots 35 if sticking should occur between clevis blocks 3 and cruciform channels 2 which cannot be overcome by the return torsion springs 13. Thus, the needles 10 cannot become disarrayed.

With reference to the crimp bore 6 fixed by the chassis plates 38, the cam blocks 17 and 18 move toward and away from the crimp bore along the output axis in a synchronous manner controlled by synchronizing levers 36 pivotally mounted upon pins 37 fixed in the chassis plates 38. Pins 39 in tie bars 19 and inner cam block 18 engage end slots in levers 36 so that the cam blocks 17 and 18 move equally in opposite horizontal directions.

The foregoing exposition describes substantially conventional crimping tool features with the addition of an adjustment screw having a micrometer-type read out. The following exposition more particularly describes the linkage according to the invention, which translates rotary input force, applied to the handles of the tool of FIG. 6, into greatly amplified linear output force to move cross head 22 and cam block 18 apart, thereby driving the conventionally cammed final output stage to cause the desired crimp.

A first strut 40 is clevised to straddle cam block 18 (the first force output member) and pivotally engages a short hard pivot pin 41 in cam block 18. An obround hole 42 through the clevis of strut 40 permits conversion upon demand from an idle pivoting mode to a heavy load rolling mode on pivot pin 41, as described in my prior U.S. Pat. No. 4,561,282. At the end opposite pivot pin 41, strut 40 has a bearing surface which includes a planar zone 43 in contact with a cam-roll member comprising long hard pins 44, and an arcuate zone 45 for rolling contact with the cam-roll member's lowermost pin (this arcuate zone could also be a flat continuation of the planar zone 43, resulting in a slight increase in output stroke). An upper overhanging extension 46 of strut 40 is urged downwardly against the uppermost pin 44 by one end of a torsion bias spring 47. A spring wire form 48 engages a hole in cam block 18 and its lower end engages the clevis end 49 of strut 40 to bias the obround holes 42 upwardly against their pivot pin 41.

A second strut 50 is half the thickness of strut 40 so it can move freely between and be guided by the cheek plates 21 of cross head 22. The small end 51 of strut 50 slips into the clevis of block 54 and, through an obround hole 52, pivotally engages another short hard pivot pin 41 mounted in a hole through clevis block 54. It should be noted that block 54 is a second force output member of the linkage. As with strut 40, the central portion of the bearing surface of strut 50 includes a planar zone 53 to bear simultaneously against the cam-roll member's pins 44 and a contiguous arcuate zone 55 for rolling action against the uppermost pin 44 of the cam-roll member (again, this arcuate zone 55 could also be a flat continuation of planar zone 53 resulting in a slight increase of output stroke). A lower underslung extension 56 of strut 50 is urged upwardly against the lowermost pin 44 by means of a bias spring 57. The other end of spring 57 bears against the bottom of clevis block 54. As noted above, one end of torsion spring 47 bears against strut 40; the other end of spring 47 bears down on the small end 51 of strut 50 to bias the obround hole 52 against its pivot pin 41. The second force output member, clevis block 54, slides in windows 27 of cheek plates 21 and its position is determined by the setting of the micrometer screw 24. The cam block 18 and cross head 22 are urged toward each other by means of coil return spring 58. It should be noted that the rolled-upon portion of the total combined planar zone of each strut's bearing surface limits angular displacement of the strut to the friction angle (tangent/coefficient of friction) so as to avoid slippage during heavy loading.

A journal 59 with tangent holes to admit pins 44 comprising the cam-roll member is spot welded at 87 (FIG. 1) to extension 60 of hand lever 61 and is enveloped by a thick bearing 62 slidably residing in radiused corner rectangular window 63 in the chassis plates 38. Similarly, a thin journal 85 is enveloped by a thin bearing 86 at the opposite side of the tool.

The extensions 60 of hand lever 61 impinge upon stop pins 64 fixed to the chassis plate 38 at the extremes of the hand lever swing. One end 65 of one of two elongated bars comprising a ratchet linkage 66 is pivoted in the hand lever 61 and one end 67 of the other elongated bar is pivoted in the chassis plate 38. As the hand lever 61 swings down, the ratchet linkage 66 telescopes to its minimum length and the ratchet cage 68 attached to the other end of the second bar advances relatively along the hand lever 61. The phantom circle 69 adjacent to the lever curve 70 represents an operator's mal-positioned index finger. Note that the hand lever curve 70 in the phantom lever horizontal position is at the micrometer thimble 71 and, had the operator's finger remained where it was during closing of the tool, it would have been pinched; instead, the advancing ratchet cage 68 has gently nudged the finger out of harm's way.

The foregoing describes a sub-assembly of the tool of FIG. 6 which can now be slipped into a shell frame member 72, a channel form extension of which forms a hand lever arm 73. It should be noted that the side walls of the shell 72 lie in two spaced apart parallel planes, between which the linkage of the invention resides. The upper wall of the shell has slots at the corners to permit the hand lever side extensions 60 and the ratchet 66 to swing up to the open position. The top extension 39 resulting from the slots covers the tool mechanism to protect against foreign matter.

Referring again to FIG. 1, shell 72 is fixed to the subassembly by means of hidden screws through the mounting block 74, and pins 30, 31 are then reinstalled. A contact locating subassembly 75, including a turret 78 pivotable about the center post 76 of a bracket 77, is then unitarily installed and fastened to the side wall of shell 72 by screws 84. The turret 78 comprises various sized locating recesses 79, an adhered indicia disk 80 and two springs 81 with plungers 82. The turret is indexable by lifting and rotating it to a selected one of a plurality of discrete positions and allowing it to reseat upon an index dowel pin 83. Referring to FIG. 2, a sight hole 88 in bracket 77 permits a view of the indexed position of the turret 78. In FIG. 2, for example, there appears a pilot hole straddled by the number 4 and a letter S indicating the position of the turret to accept a number 4 size socket contact.

FIG. 1 also shows the nesting arrangement of the various parts noted in FIG. 6, with the bias and return springs omitted for clarity. The thin journal 85 and thin bearing 86 appear in FIG. 1 opposite the thick journal 59 and thick bearing 62. Journals 59, 85 are spot welded at 87 to extensions 60 of the hand lever 61.

FIG. 3 illustrates five possible cam-roll member cross sections. FIG. 3a is the economical dual hard pin 44 design shown in FIGS. 1, 6, 13, 15, 17 and 19. FIG. 3b is a solid embodiment of the member of FIG. 3a which is stronger but more costly than the latter. The shape shown in FIG. 3c accelerates the linkage action toward the end of the crimp stroke; it can withstand more torque than the design of FIG. 3a and has more cylindrical compressive strength than that of FIG. 3b. FIG. 3d is an ovate variation of the design of FIG. 3b, which provides increased force at the start of the hand lever stroke and reduces the stroke slightly. FIG. 3e represents a combination of the designs of FIGS. 3c and 3d.

FIG. 10 illustrates the ratchet linkage 66 in the locking mode; operation of the ratchet is summarized as follows:

In FIG. 10, the ratchet is shown in the tool closing phase, i.e., the top elongated ratchet bar is moving in the "slip" direction though the ratchet cage. An attempt to open the tool prematurely by reversing the direction of movement of this bar would be prevented by a spring loaded sprag roller 89 wedging and locking in the wedge shaped space between the ratchet bar and the facing "Vee" ramp side 90 of a wedge formed in a recess cut into the other ratchet bar.

In FIG. 11, the ratchet assembly is shown in the opening phase (after full closing and ratchet reversal) in which the ratchet can slip freely in both directions. The sprag roller 89 is on the opposite side 91 of the wedge, which has been formed to a fillet radius equal to the sprag roller radius or slightly less, hence in the FIG. 11 position, the sprag roller 89 does not wedge and lock. When the tool nears the open position, the ratchet again reverses, ready for the next closing stroke as in FIG. 10. Coil springs 92, 93 center the sprag roller when either of two transverse depressions 94, 95 found on the one ratchet bar arrives opposite the wedge. It will be understood from the above that the slender ratchet linkage members are never subjected to compressive buckling stress and the only load on them due to "locking" is the small tensile load required to lift a partial weight of the tool.

FIGS. 4 and 5 show an optional emergency ratchet release. A hole 96 is formed on the front wall of the ratchet cage 68 just ahead of the leading edge of the sprag roller 89 when it is in the locked (closing phase) position. A leaf spring clip 97 fastened to the ratchet cage 68 has a sharp cone point 98 attached in line with hole 96. To use the emergency ratchet release, the operator applies closing force to the hand lever 61 and simultaneously presses the spring leaf 97 to cause the point 98 to enter the hole 96 where it can unseat the sprag roller 89 and prevent its relocking as the hand lever 61 is raised to the open position. If desired, a piece of adhesive foil or the like 99 may be placed over the hole 96, so that use of the emergency release causes point 98 to pierce the foil 99 and thus provide evidence that the release has been used. The pierced foil 99 can then be removed and replaced with a new piece by an authorized person.

The four indent crimping tool of FIGS. 6 and 1 can be used to crimp both pin contacts and socket contacts onto wires. FIG. 7 shows a typical pin contact and FIG. 8 a typical socket contact of the same size; wire barrels 100, 101 and circumferential locating ridges 102, 103 are common to both contacts, as are the wires 104, 105.

To operate the crimping tool of FIG. 6, the operator selects the appropriate turret position for the contact size and type (pin or socket), adjusts the micrometer setting for the size of wire to be crimped, stands the tool on its bottom edge, inserts the stripped wire end into the contact, pushes the wire with its contact through the crimp bore 6 of the tool until stopped in the locating recess 79 of turret 78, and presses the hand lever down to the closed position, thereby effecting the crimp. The lever 61 is then raised into the open position and the crimped contact is removed.

It will be understood that the crimp indenter points 4 must open to admit the locating ridges 102 or 103, as the contact proceeds to its position within recess 79 of turret 78. The tool is then closed (at essentially zero force) until the indenter tips 4 impinge upon the wire barrel 100, 101. The crimp action starts here with a force sufficient to buckle the barrel inwardly against the wire. The crimp force increases until the indenter tips 4 have reached the prescribed root diameter of the crimp, which is determined by the setting of the micrometer adjustment assembly. A large contact requires more crimp stroke than a small contact. The maximum stroke requirement occurs when the largest size contact is crimped with the smallest wire prescribed for that contact; in that case, the micrometer will be set to provide a reduced crimp root diameter but the tool must still open to clear the contact ridge 102 or 103. The adjusting movement of the micrometer screws 24 against the clevis block 54 shifts the pivot axis of the cam-roll member and the hand lever extension 60 toward the crimp bore end of the tool (left in FIG. 6); since the open hand lever bears against its stop pin, such movement causes the lever to swing slightly in the closing direction, leaving less stroke available for crimping. The tool of FIG. 6 is designed to have adequate maximum stroke after being adjusted for this condition, plus some additional stroke as a safety factor to accommodate deflection in the various high load components; large connectors, of course, require more force than small connectors so the deflections will vary.

FIGS. 12 through 20 illustrate a variation of the tool of FIG. 6 wherein optional tensile links insure positive retraction of the force applying members in addition to the return spring. In the tool illustrated in FIGS. 13, 15, 17 and 19, no micrometer adjustment is shown; accordingly, the right hand pivot pin 41 in the figure is not mounted in a moveable clevis block such as 54 in FIG. 6 but rather is mounted directly in the pair of cheek plates 121. Thus, in these figures, the second force output member of the linkage is the pair of cheek plates 121. Referring to FIGS. 12 through 20, link 106 is internally formed to partially surround journal 124 and to engage half the diameter of one pivot pin 41. Grooves 109, 110 and 111 are milled in the clevis end 112 of strut 113 to loosely accommodate the link 106. Link 107 is similar to link 106 except that it has offset bends 108 to engage steps 114, 115, 116 milled in the far side of strut 117.

The bearing surfaces of struts 113 and 117 have planar zones 53 blending into arcuate zones 55. These arcuate zones 55 describe sectors of cylinders whose centers coincide with the struts' pivot axes at the centers of obround holes 131, 132. The planar zones 53 bear upon opposite sides of pins 44 comprising the cam-roll member. The angular extensions 56 of struts 113, 117 bear upon the pins 44 under the urging of first ends of torsion bias springs 47, 118. The second end of spring 118 reacts against a fixed pin 123. The obround hole 131 in the clevis end 112 of strut 113 is biased upwardly against the strut's pivot pin 41 by a spring wire form 48, and the obround hole 132 in end 119 of strut 117 is biased downwardly against its pivot pin by the second end of spring 47. Return coil spring 58 urges the two force output members, block 120 and cheek plates 121, towards each other to maintain a retractive force in the linkage. Cheek plates 121 are pinned to tie bars 122. Slots 125 in cheek plates 121 reciprocate on a guide pin 31 fixed in the chassis plates 126 and shell walls 127. The long pins 44 of the cam-roll member slip fit into journals 59, 85 which are spot welded at 87 to extensions 60 of the hand lever 61. The journals 59, 85 rotate in bearings 128, 129 respectively, which are snug slip fitted in round holes in the chassis plates 126. A space 130 can accommodate a ratchet linkage 66 or other accessory, if desired. Installation of hand lever 61 onto the tool sub-assembly is accomplished by installing bearings 128, 129 on journals 59, 85, spreading the extended ends 60 of hand lever 61 so the bearings and journals slip over the outside of the tool sub-assembly and moving them down until they snap into the bearing receiving round holes in the chassis plates 126. The tangent holes in the hand lever journals 59, 85 and in slip-on journals 124 are then aligned with each other and with the gap between the strut bearing surface planar zones 53 by the use of piloted drift pins. The long pins 44 are then slipped into place one at a time forcing each piloted drift pin out of the tangent holes.

FIGS. 14 through 19 will now be used to describe the unique rotary-cam/rolling-toggle action of the linkage of the invention. Since such action and specific linkage structures also occur in the tool of FIGS. 6 and 1, FIGS. 14, 16 and 18 show the micrometer thimble 71 and ratchet 66 even though they are not shown in FIGS. 15, 17 and 19.

The operating stroke of the linkage in a crimping tool as shown undergoes two phases, an essentially zero force idling first phase (as the tool closes to engage the workpiece) followed by a power phase which initially delivers enough output force to buckle the workpiece inwardly, and then increases output force to a maximum to complete the crimp.

FIGS. 14 and 15 show the hand lever and linkage in the full open position, and FIGS. 16 and 17 show the hand lever and linkage at the end of the first idling phase where the indenter tips have just impinged on the contact wire barrel. In the first idling phase, struts 113 and 117 are cammed apart by rotation of the cam-roll member and its pins 44; during this phase, bias springs 47 and 118 can overcome the tension of the return spring 58 and thus cause the strut projections 46 and 56 to maintain contact with the pins 44, so that only rotary camming action takes place here. After the first phase is completed, the power phase, involving a rolling toggle action begins. At the impingement upon the workpiece, there is an immediate increase in the workload which cannot be resisted by the bias springs 47, 48, 118 so that, under the demand of this greater load, traction occurs between the cam-roll member pins 44 and the arcuate strut bearing surfaces 53, resulting in a rolling-toggle action which proceeds in an exponential force progression from the intermediate position of FIGS. 16 and 17 to the end of the stroke shown in FIGS. 18 and 19. The linkage of the invention greatly amplifies the rotary input force from the lever 61 to provide enough output force for the early buckling stage of the tubular wire barrel and then exponentially amplifies the output force of the second rolling toggle phase as it progresses from the buckling stage through the final crimping stage.

FIGS. 21 and 22 illustrate use of the linkage of the invention in another tool; in this embodiment, one of the two force output members is anchored to the tool shell which includes an opposed "C" frame. Output motion occurs in the other force output member and proceeds toward the opposed "C" frame. The moveable force output member and the fixed "C" frame may contain tooling inserts of interchangeable character for crimping, staking, swaging or cutting, as desired.

As shown in FIG. 21, a channel form tool shell 140 has fixed therein a "C" frame reinforcing member 141. Slidably mounted within shell 140 is a ram sub-assembly 142 with one tool insert 143 mounted therein in opposition to a complementary tool insert 144 fixed in the "C" frame. The ram sub-assembly 142 shown consists of a channel form shell 145 having one end 146 walled and the other end closed by a first force output member, clevis block 147, fixed therein by means of rivets 148. A second force output member, clevis block 149, resides within the ram shell and is fixed to the tool shell by pin 150 retained by snap springs 151. The top edges of slots 152 cut into the ram shell walls, ride on rollers 153 which can rotate upon pin 150 as the ram reciprocates along an output axis. A return spring 154 urges the assembly 142 toward the tool's open position.

Interposed between the force output members, clevis blocks 147 and 149, are the other components of a linkage according to the invention, consisting of first and second struts 155 and a cam-roll member including rolls 156 driven by pins 157. The struts 155 pivotally engage clevis blocks 147 and 149 by pins 158 and 159. Pivotal strut motion is restricted in one direction by impingement against the back walls of the clevises in blocks 147 and 149. Bias springs 160, 161, 162 control the initial positions of struts 155 according to the invention. The driving pins 157 in the cam-roll member project through engaging holes in bearing journals 163 and matching engaging holes in operating lever extensions 164. Bearing rings 165 surround the bearing journals 163. During the tool closing stroke, i.e., from the initial proximal spacing of clevis blocks 147 and 149 to their final more distant spacing, the bearing rings 165 roll along the floor of the tool shell as the journals 163 rotate. Thus, in the tool of FIG. 21, the pivot center of the cam-roll member, which is attached to operating lever 66, migrates during the closing stroke, as opposed to the tools of FIG. 6, where migration of the pivot point of the cam-roll member occurs only due to micrometer adjustment and not during tool closure, and FIGS. 13 through 19, where such pivot center does not migrate at all. Operating lever 166 is shown in solid lines in the open position and in broken lines in the closed position. When lever 166 stops in the closed position, its pivot end rises slightly and the bearing rings 165 bear against a reinforcing channel 167 spot-welded to the top of ram channel 145 (since the top of the ram channel is weakened by the longitudinal slots cut therein to admit hand lever extensions 164, the reinforcing channel 167 is added to better resist the upward force of the bearing rings 165). Holes 168 (FIG. 22) formed in the side walls of the ram channel in line with the cam-roll member's driving pins 157 allow assembly and disassembly of the cam-roll member. A stop pin 169 is fixed in shell 140 to limit the upward travel of lever 166. The conversion on demand from a rotary slip cam mode to a rolling toggle mode occurs in the tool of FIG. 21 in the same manner as described for the tools of FIGS. 6 and 13 through 19.

It should be noted that rolls 156 and pins 157 orbit about the pivot center of the cam-roll member, but do not rotate with respect to each other.

In the tool of FIG. 21, the linkage of the invention is stopped about 10 degrees short of the full toggle effect, so that a major force factor is due to the close center-to-center distance of the cam rolls 156, which provides maximum input leverage from the lever 166.

FIG. 25 shows an embodiment of the linkage of the invention comprising only one strut, shown to the right of the cam-roll member. In this embodiment, the cam-roll member makes direct contact with the first force output member, on the left in the figure, acting against the slightly sloping bearing surface of that output member. The second force output member, to the right in the figure, is engaged by the single strut in the typical arrangement described with previous drawing figures. Bias springs provide for early low load slip camming until the springs are overcome by the acquisition of the working load, after which there is the previously described shift on demand to the rolling toggle mode. The cam-roll position is controlled by a pin 170 through its pivot center which then projects through and loosely engages slots 171 in the clevis output member; note that in this embodiment the pivot center of the cam-roll member is not at the geometric center between cam surfaces.

FIG. 25 also illustrates integration of the cam-roll member with the input lever 172, a step which provides for slightly thinner cross-section when the linkage is used in a crimping tool as shown.

As will be appreciated by those skilled in the art, many other design choices exist when incorporating a linkage of the invention into a crimping tool. For example, the tool may include a first lever arm constituting an extension of the shell frame member, a second lever arm pivotally attached at one end to the shell frame member and serving with the first lever arm as the members gripped by an operator's hand, a third lever arm attached at one end to the cam-roll member for rotation thereof, and means for engaging the second lever arm with the free end of the third lever arm, so that when the first and second lever arms are brought together by the operator, the third lever arm rotates the cam-roll member to thereby generate the necessary crimping force.

To illustrate some of the advantages of a linkage according to the invention over a conventional pivoted toggle linkage of the prior art, FIGS. 23 and 24 show in simplified form typical mechanisms of the two. In FIG. 23, a linkage according to the invention is shown in substantially the form depicted in FIG. 6—i.e., with first and second force output members pivotally engaged by first and second struts, the struts in turn being acted upon by a cam-roll member comprising two tangentially abutting cylindrical pins, and a force input lever arm attached at one end to the cam-roll member for rotation thereof. FIG. 24, drawn to the same scale as FIG. 23, shows a conventional pivoted toggle linkage in which a movable force output member on the left is pivotally engaged and acted upon by one end of a first toggle link through a first pivot pin. The other end of the first link is pivotally joined to one end of a second link through a second pivot pin. The second link in turn is pivotally attached to a fixed member through a third pivot pin spaced from the second pivot pin, and an extension of the second link forms a force input lever. In both figures, bias springs are shown diagrammatically.

For this comparison, consider the difference in load sustaining capacity between a pin operating in a compressive rolling mode and a similar pin operating in a journal mode.

Because the cam-roll member of FIG. 23 transfers force by a rolling toggle action as has already been discussed, the key property in designing the linkage of FIG. 23 is the inherent compressive strength of the cam-roll member pins. For convenience, let it be assumed that the cam-roll member pins are fabricated of hardened steel (Rockwell C 60-63), and that such hardened rolling elements have a long service life at a force level of 18,000 pounds per unit of diameter per unit of length (such force level is conservative for hardened steel rolling elements). In FIG. 23, if the cam-roll member pin diameters are selected at one unit and the pins are each one unit long, the input toggle leg length, or center-to-center distance of the two tangent pins, is one unit and the cam-roll member can be used satisfactorily at an 18,000 pounds output rating.

In the case of the journal-pivoted toggle linkage of the prior art, FIG. 24, the property of concern is the wear life of the pivot pins turning in the links surrounding them. Again for convenience, let it be assumed that the pivot pins of FIG. 24 are hardened steel (Rockwell C60-63) with slightly lubricated surfaces and that such pins, in slow intermittent service, can show a useful service life under a force of 9,000 pounds per unit of diameter per unit of length, i.e., half the capacity of the rolling toggle linkage. For calculation purposes, let it be assumed that the pivot pin dimensions in FIG. 24 are 1.4142 units diameter × 1.4142 units length, making the product of diameter × length equal to 2. Although such dimensions would result in a thicker linkage in FIG. 24 than in FIG. 23 (which has one unit diameter × one unit long cam-roll pins), let it be assumed that the additional thickness is not detrimental. With such dimensions and the service life properties assumed, the pins of FIG. 24 could operate satisfactorily at an output force level of 9,000×1.4142×1.4142=18,000 pounds output rating. It can be assumed that the second and third pivot pins of FIG. 24 are separated by a conventional minimum center-to-center distance of two diameters, or 2.8284 units, to allow for mounting and for the link structures surrounding the pins; this center-to-center distance represents the input toggle leg length in the linkage of FIG. 24. From the foregoing, it follows that for equal load capability and equal input/output ratio, the input lever in the journal-pivoted toggle linkage must be 2.8284 times longer than in the linkage of the invention. This greater length may well exclude a high force tool with a journal-pivoted toggle linkage from the practical size range of hand operated tools. Looked at another way, the length of the input lever in a tool using my rolling toggle linkage as compared to one using a journal-pivoted linkage, can be shorter by a factor of 2.8284, resulting in a tool which is smaller, lighter, less expensive and more easily manipulated, carried and stored. For example, in the tool of FIG. 6, the input lever may desirably have an effective length from pivot to point of force application (one inch from the end) of 14.75 inches and a main body length of 6.25 inches, resulting in an overall tool 22 inches long. To give a conventional journal-pivoted toggle tool the same operating characteristics would require an input lever length of 2.828×14.75=41.72 inches; adding to that the tool main body length of 6.25 inches plus the one inch to the lever end gives an overall length of 48.97 inches, i.e., 2.226 times longer than the tool incorporating my invention.

In summary, and based on the foregoing assumptions, the advantages of the invention are two-fold: at equal pivot diameters, the linkage of the invention doubles the load capacity and doubles the input-output ratio over the conventional linkage. At equal load capacity and input/output ratio, the input lever length with my linkage can be shorter by a factor of 2.8284 than that with the conventional linkage.

From the foregoing hypothetical comparison, it can be seen that, at a given force input/output level, a linkage according to the invention represents a major and heretofore unavailable increase in force translation and transmission efficiency over conventional pivoted toggle linkages of the prior art.

Other calculations comparing the load sustaining capability of the linkage of my invention with that of conventional lever linkages of the prior art, have shown that the linkage of my invention has as much as 100 percent greater load sustaining capability than prior art linkages of equivalent size.

Although the linkage of my invention is especially useful when embodied in crimping tools and the like, and has been described herein in such environments, it is to be distinctly understood that the invention is not limited to use in such tools but may be otherwise variously embodied within the scope of the following claims.

I claim:

1. A compact linkage for translating rotary input force into amplified linear output force, said linkage residing between two spaced apart parallel planes and comprising:
   A. first and second force output members adapted for relative linear movement toward and away from each other along an output axis parallel to said planes, between an initial proximal spacing and a final more distant spacing;
   B. first and second struts pivotally engaging said first and second force output members respectively, each said strut being adapted for oscillatory movement about a pivot axis which is normal to said planes and having a bearing surface spaced from its pivot axis and also normal to said planes, the bearing surfaces of said struts facing each other and being separated by a predetermined minimum distance when said force output members are at their initial spacing and a predetermined maximum distance when said force output members are at their final spacing;
   C. a cam-roll member positioned between said strut bearing surfaces, said cam-roll member being rotatable about a central axis which is normal to said planes and having cam surfaces in contact with both said strut bearing surfaces, the shape of said cam-roll member being such that rotation thereof from a first position to a second position increases the distance between said strut bearing surfaces from said predetermined minimum distance to said predetermined maximum distance; and
   D. means for applying input force to rotate said cam-roll member from said first position to said second position.

2. A linkage as claimed in claim 1, in which said strut bearing surfaces and said cam surfaces are so shaped that rotation of said cam-roll member from said first to said second positions when said struts are unrestrained against pivoting results in rolling contact between said cam surfaces and said strut bearing surfaces and also concomitant pivoting of said struts in a rotational direction opposite to that of said cam-roll member.

3. A compact linkage for translating rotary input force into amplified linear output force, said linkage residing between two spaced apart parallel planes and comprising:
   A. first and second force output members adapted for relative movement toward and away from each other along an output axis parallel to said planes, between an initial proximal spacing and a final more distant spacing;
   B. first and second struts pivotally engaging said first and second force output members respectively, each said strut being adapted for oscillatory movement about a pivot axis which is normal to said planes and having a bearing surface spaced from its pivot axis and normal to said planes, the bearing surfaces of said struts facing each other and being separated by a predetermined minimum distance when said force output members are at their initial spacing and a predetermined maximum distance when said force output members are at their final spacing;
   C. a cam-roll member positioned between said strut bearing surfaces, said cam-roll member being rotatable about a central axis which is normal to said planes and having cam surfaces in contact with both said strut bearing surfaces, the shape of said cam-roll member being such that rotation thereof from a first position to a second position increases the distance between said strut bearing surfaces from said predetermined minimum distance to said predetermined maximum distance;
   D. said strut bearing surfaces and said cam surfaces being so shaped that rotation of said cam-roll member from said first to said second positions when said struts are unrestrained against pivoting results in rolling contact between said cam surfaces and said strut bearing surfaces and also concomitant pivoting of said struts in a rotational direction opposite to that of said cam-roll member;
   E. biasing means restraining said struts against pivoting out of the position they assume when said cam-roll member is at said first position, whereby when said force output members are under zero or low loads, rotation of said cam-roll member from said first position causes said struts to be slip-cammed apart without pivoting, but when said force output members are under loads sufficient to overcome the effect of said biasing means, further rotation of said cam-roll member causes rolling contact between said cam surfaces and said strut bearing surfaces and concomitant pivoting of said struts; and
   F. means for applying input force to rotate said cam-roll member from said first position to said second position.

4. A linkage as claimed in claim 3 in which each said strut bearing surface is a flat plane normal to said parallel planes and substantially normal to an axis joining the pivot axis of said strut with the center of said bearing surface.

5. A linkage as claimed in claim 3 in which at least a portion of each said strut bearing surface is convexly curved in the direction of said cam-roll member.

6. A linkage as claimed in claim 5 in which the bearing surface of each strut defines a sector of a cylinder having its center at the strut's pivot axis.

7. A linkage as claimed in claim 3 in which the cam surfaces of said cam-roll member are convexly curved in the direction of the strut bearing surface contacted by each cam surface.

8. A linkage as claimed in claim 7 in which the cam surfaces of said cam-roll member are sectors of cylinders.

9. A linkage as claimed in claim 8 in which said cam-roll member comprises two cylindrical pins having axes normal to said parallel planes and being tangent to each other at said central axis.

10. A linkage as claimed in claim 8 in which said cam-roll member comprises two cylindrical pins having axes normal to said parallel planes and being spaced from each other along a line passing through their axes and said central axis.

11. A linkage as claimed in any of claim 4 through 10 or 3 wherein said means for applying input force comprise:
A. a shell frame member sized and shaped to closely accommodate said force output members for movement along said output axis, said shell frame member enclosing said linkage, an extension of said shell frame member forming a first lever arm; and
B. a second lever arm attached to said cam-roll member for rotation thereof, said second lever arm being so sized and positioned with respect to said cam-roll member that when said cam-roll member is in said first position, said second lever arm forms an angle with said first lever arm and when said cam-roll member is in said second position, said second lever arm is substantially parallel to and coextensive in length with said first lever arm.

12. A linkage as claimed in claim 11 further including a ratchet mechanism which prevents reversal of motion of said lever arms during rotation of said cam-roll member from said first position to said second position but allows random reversal of motion of said lever arms between the time said cam-roll member has reached said second position and is being rotated toward said first position and the time said cam-roll member reaches said first position, said ratchet mechanism comprising:
A. a first elongated bar having a longitudinal axis parallel to said spaced apart planes and one end pivotally attached to said shell frame member at a point between said cam-roll member and the end of said first lever arm;
B. a second elongated bar having a longitudinal axis parallel to the longitudinal axis of said first bar and having one end pivotally attached to said second lever arm;
C. said first and second bars each having a longitudinal surface, at least a portion of said longitudinal surface of said first bar being maintained in contact with at least a portion of said longitudinal surface of said second bar for sliding movement of said bars relative to each other in the direction of their longitudinal axes, one of said longitudinal surfaces including an elongated recess in the longitudinal direction, said recess being of uniform depth except for a central transverse wedge protruding toward the other longitudinal surface, the side of said wedge which is closest to said first lever arm forming a straight sloping ramp, the other side of said wedge shaped to form a 90 degree fillet having a radius no larger than a maximum radius R, the other said longitudinal surface including two transverse spaced apart depressions, one close to the pivot point of said other bar and the other near the end of said other bar, the first depression being shorter than the second;
D. a rolling member having circular transverse cross-section of predetermined diameter D and radius R positioned within said elongated recess in said one longitudinal surface and in contact with a point on said other longitudinal surface;
E. spring biasing means within said elongated recess tending to maintain said rolling member in contact with a surface of said wedge; and
F. means located on said second bar for maintaining said portions of said longitudinal surfaces in sliding contact and retaining said rolling member and spring biasing means within said elongated recess, wherein the distance between said other longitudinal surface and the tip of said wedge is less than D, the distance between said other surface and the deepest surface of said recess is greater than D, and the distance from the deepest surface of each of said spaced apart depressions to the tip of said wedge is greater than D when said V-shaped wedge is opposite said depression.

13. A compact linkage for translating rotary input force into amplified linear output force, said linkage residing between two spaced apart parallel planes and comprising:
A. first and second force output members adapted for relative movement toward and away from each other along an output axis parallel to said planes, between an initial proximal spacing and a final more distant spacing, said first force output member having a bearing surface normal to said parallel planes and facing said second force output member;
B. a strut pivotally attached to said second force output member, said strut being adapted for oscillatory movement about a pivot axis which is normal to said planes and having a bearing surface spaced from its pivot axis and also normal to said planes, the bearing surface of said strut facing the bearing surface of said first force output member and separated therefrom by a predetermined minimum distance when said force output members are at their initial spacing and a predetermined maximum distance when said force output members are at their final spacing;
C. a cam-roll member positioned between the bearing surface on said first force output member and the bearing surface on said strut, said cam-roll member being rotatable about an axis which is normal to said planes and having cam surfaces in contact with both said bearing surfaces, the shape of said cam-roll member being such that rotation thereof from a first position to a second position increases the distance between said bearing surfaces from said predetermined minimum distance to said predetermined maximum distance; and
D. means for applying input force to rotate said cam-roll member from said first position to said second position.

14. A linkage as claimed in claim 13 in which said means for applying input force to rotate said cam-roll member operate only on said cam-roll member and have no direct operative connection to either of said force output members or to said strut.

* * * * *

UNITED STATES PATENT AND TRADEMARK OFFICE
CERTIFICATE OF CORRECTION

PATENT NO. : 4,934,204

DATED : June 19, 1990

INVENTOR(S) : Edward L. Hadden, Sr.

It is certified that error appears in the above-identified patent and that said Letters Patent is hereby corrected as shown below:

In column 4, line 29, delete "v-shaped."

In column 8, line 39, delete "39" and substitute --26-- therefor.

In column 14, line 2, insert --(wiping)-- between "journal" and "mode."

In column 18, line 23, delete "v-shaped."

Signed and Sealed this

Seventeenth Day of September, 1991

Attest:

HARRY F. MANBECK, JR.

Attesting Officer

Commissioner of Patents and Trademarks